United States Patent Office 2,985,239
Patented May 23, 1961

2,985,239

CEMENT COMPOSITIONS AND PROCESS OF CEMENTING WELLS

Francis J. Shell, Bartlesville, Okla., assignor to Phillips Petroleum Company, a corporation of Delaware No Drawing. Filed June 25, 1956, Ser. No. 593,583

35 Claims. (Cl. 166—31)

This invention relates to cement compositions and processes of cementing wells. In one aspect it relates to such compositions and processes in which a first agent is employed to increase the cement thickening time of a hydraulic natural cement and reduce the water loss, and a second agent is employed to decrease the resulting cement thickening time without losing any substantial amount of water loss reduction value of said first agent. To the extent that the second agent is added, the net result is a reduced water loss cement, along with a regulated cement thickening time which may be greater, equal to, or less than the normal thickening time of said hydraulic natural cement in the absence of both of said agents and less than the thickening time when only the first agent is present. Another aspect is to provide a cement composition containing in addition to these two agents, considerable amounts of bentonite, sodium chloride, and lightweight aggregate, such as diatomaceous earth.

This application is a continuation-in-part of my copending application Serial No. 472,954, filed December 3, 1954, now abandoned.

It has been found that the addition of said first agent, sodium carboxymethyl hydroxyethyl cellulose mixed ether for example, to cement composition aqueous slurries containing hydraulic natural cement, such as Portland cement, has two valuable effects, namely, reducing the water loss from such slurries to adjacent and contacting porous, pervious, earth formations by filtration, known to the art as water loss reduction, and increasing the thickening time of the cement, known to the art as the time until the consistency of the slurry reaches 100 poises. At the same time the time of initial set and final set are also somewhat retarded, but it is preferred to refer to thickening time as this has a closer relation to the ability of pumps to pump the cement down the well, which ability is obviously reduced somewhat before initial set is reached. Thickening time is tested under API code RP 10B. Water loss is tested under API code 29, which was drafted for drilling muds.

However, I have found that said first agent in reducing the water loss often results in a longer thickening time than necessary for good operation, which results in having to hold pressure on a well beyond the normal quitting time of the men on the work shift that cemented the well, which results in overtime payments and also the danger of losing pressure through some accident before the cement takes its initial set. Attempts to add a second agent to reduce the thickening time in the past have all been failures, in that while the thickening time was reduced, the water loss was also increased, and much, or all of the value of the first agent was lost. It is important to have a low water loss, as otherwise the cement slurry will dehydrate and set prematurely when it contacts a porous and pervious formation, especially when the drilling mud cake has been removed by scrapers preparatory to cementing the well, resulting in pump failure under increasing pressure to place the cement slurry properly throughout the entire extent of the well that should be cemented in order to do a succesful well cementing job.

One object of the present invention is to provide a suitable hydraulic natural cement aqueous slurry, and suitable processes employing the same, for cementing casing in wells, for squeeze cementing in wells, and for grouting cracks, fractures or voids in natural formations, such as in wells, or in man-made formations such as dams, breakwaters, walls and massive foundations and stuctures of all types.

Another object of this invention is to provide a dry hydraulic natural cement powder which is a novel composition of matter, and which may be mixed with water to form an aqueous cement slurry which is a novel composition of matter and which has at least one of the following useful properties: a low water loss, an extended thickening time, a relatively low specific gravity, a specific gravity in the slurry form approximately that of well drilling mud, and/or can be perforated with minimum cracking or shattering.

Further objects of the invention reside in the provision of a slurry of the above cement.

These and further objects of the invention will be more readily apparent in the following description.

In the cementing of oil wells it is customary to mix a hydraulic natural cement, for example a Portland or Portland-type cement, with the requisite amount of water to form a pumpable, neat slurry, and to pump the mixture into the well and down the hole into the place where it is desired to have it harden. In present oil well drilling practice, with wells commonly ranging from 6,000 to 12,000 feet or more in depth, using a substantially heavier cement slurry than the drilling mud it replaces may result in forcing the cement out into the formation due to collapse of a friable formation, or displacement of the fluid in said formation by the heavier cement slurry, with the result that much cement is lost out into the formation instead of cementing much higher in the well in the annulus between the casing and the wall of the well. In some cases it is necessary to resort to costly stage cementing.

Thus, in the cementing of oil and gas wells, it is desirable to control the density of the cement slurry to about the same density as the density of the drilling mud used in drilling the well. In the practice of the invention, this is done by adding sufficient diatomaceous earth plus water to reduce the slurry density or by adding a weighting agent to increase the slurry density. The use of diatomaceous earth permits the use of much larger quantities of water resulting in lighter cement slurries and a lighter cement when set.

The cement slurry must remain fluid long enough to permit it to be pumped into place and then it must set up with sufficient strength to support the well casing and properly seal off the well from penetrated formations. Thus, it is desirable to control the thickening time of the cement slurry (which heat and pressure in deep wells tend to accelerate) and reduce water loss to porous formations penetrated by the well, which water loss to a porous formation can cause premature termination of the thickening time and premature set due to the loss of water to said porous formation. In the practice of the invention, this is done by adding an alkali metal carboxymethyl hydroxyethyl cellulose mixed ether, hereinafter called CMHEC, to the cement slurry.

However, it sometimes happens, particularly in shallow wells, that when using CMHEC as described, the thickening time is increased too much. Therefore, to reduce the thus extended thickening time without reducing the water loss, it is sometimes desirable to add a thickening time accelerator. The presently preferred accelerator, according to this invention, is an alkali metal silicate having a silicon dioxide to alkali metal oxide mol ratio of from 1 to 2.5, preferably 1.6 to 2.5, more preferably 1.8 to 2.2. As discussed further hereinafter, powdered anhydrous alkali metal silicates having the said silica to metal oxide ratio are particularly preferred.

In some instances, the addition of 1 to 4 percent of bentonite, is added to the cement slurry so as to increase the early strength of the set cement.

Thus, the invention provides new hydraulic natural cements, new hydraulic natural cement aqueous slurries, and processes for using said cements and said slurries to permit control of density, thickening time and water loss in the cementing of oil and gas wells. Other aspects and advantages of the invention will be apparent to those skilled in the art upon reading this disclosure.

It is customary to gun perforate through the casing and cement into the oil formation as shown at 38 of Figure 5 of C. C. Brown 2,114,521 of April 19, 1938. With cements of the prior art, the bullets tend to shatter the cement or crack it radially around the holes, with the result that the cement seal is broken and water can enter from a water formation in the oil, entering the perforations from the oil formation by traveling along these cracks. Obviously gas, oil and water under high pressure can travel to places above or below that they should not reach, and a shattered or cracked cement job is troublesome, dangerous and undesirable from an engineering, economic and legal viewpoint, the latter as laws often require perfect cementing between formations containing different fluids.

Everything which is said applying to natural formations in wells applies also in some degree to man-made formations being grouted, and the word "formation" as used herein is regarded as generic to natural earth formations, geological formations, and man-made formations such as structures.

By hydraulic natural cement this invention intends to include all mixtures of lime, silica, and alumina, or of lime and magnesia, silica and alumina and iron oxide (magnesia for example may replace part of the lime, and iron oxide a part of the alumina), as are commonly known as hydraulic natural cements. Hydraulic natural cements include hydraulic limes, grappier cements, puzzolan cements, and Portland cements. Puzzolan cements include slag cements made from slaked lime and granulated blast furnace slag. Because of its superior strength Portland cement is preferred among the hydraulic natural cements, but as the art of cements recognizes hydraulic natural cements as a definite class, and as results of value may be obtained with any member of that class, it is desired to claim all hydraulic natural cements. In addition to the ordinary construction grades of Portland cement or other hydraulic natural cements, modified hydraulic natural cements and Portland cements designated as high-early-strength cement, heat resistance cement, and slow-setting cement may be used in the present invention. The "Condensed Chemical Dictionary" 3rd edition, 1942, published by Reinhold Publishing Corporation, New York, N. Y., page 173, column 2, paragraph 4, entitled, "Natural Cements," shows the preceding definition and classification of hydraulic natural cements is recognized and followed by those skilled in the art.

In cementing wells in accordance with my invention, the dry hydraulic natural cement is mixed with one or more of the agents listed in the following Table I. The amounts given in said Table I have been found operable and useful in practicing the invention when used in the percentage amounts given in the column "Operable Amounts" and to give best results when used in the percentage amounts given in the column headed "Preferred Amounts." Said percentages are all weight percentages of the weight of the dry hydraulic natural cement and are thus equivalent to parts by weight per 100 parts of dry cement.

The mixing of said agents with the cement need not occur anywhere near the well being cemented but can take place any number of miles away, and several months before, and the ready mixed cement composition brought to the well in sacks or in a bulk cement truck. The dry cement composition is then mixed in any suitable manner, such as by jet mixers, with a sufficient amount of water to form a pumpable slurry. The amount of water employed can vary widely as described further hereinafter. Said slurry is then pumped down through the casing and is forced upward around the outer surface of the casing into the annulus between said casing and borehole and is thus brought into contact with said casing and an earth formation penetrated by said borehole. If desired, instead of forcing said cement slurry out the end of the casing, the slurry can be forced through perforations in the lower portion of the casing or in an intermediate portion of the casing. Cement slurries made in accordance with the invention are adaptable for use in squeeze cementing operations or in any other operations wherein cement slurry is brought into contact with the well casing and a formation penetrated by the borehole. The U. S. patents now in class 166, Wells, subclass 21, Cementing or Plugging (and indented subclasses), disclose a number of other suitable cementing processes which can be employed in my invention.

TABLE I

| Materials | Operable Amounts, percent | Preferred Amounts, percent |
|---|---|---|
| Bentonite | 0 to 5 | 1 to 4 |
| Aggregate | 0 to 70 | a 15 to 50 |
| CMHEC b | 0.1 to 10 | 0.3 to 3 |
| AM silicate c | 0.1 to 15 | d 0.3 to 7 |
| Weighting agent e | 0 to 500 | | a 20% for 12 to 13.5 lbs. per gallon, 40% for 10.5 to 12 lbs. per gallon cement slurry densities, other slurry densities in proportion.
b CMHEC is used as an abbreviation herein for a cement thickening time extending and water loss reducing agent selected from the group consisting of acid carboxyalkyl hydroxyethyl cellulose mixed ethers in which the alkyl group contains one to two carbon atoms, preferably sodium carboxymethyl hydroxyethyl cellulose mixed ether, in which the total substitution per anhydroglucose unit of the cellulose of both carboxyalkyl and hydroxyethyl groups is between 0.5 to 1.75, the hydroxyethyl substitution is from 0.35 to 1.35, and the carboxyalkyl substitution is from 0.15 to 1.2, and all metal, ammonium, amide, and other salts of said mixed ethers, but preferably the alkali metal salts thereof. The amount of CMHEC varies with the amount of aggregate used and ranges from about 0.3 with no aggregate to 3% with 60% aggregate, and other amounts in proportion. However, 0.1 to 10% gives results of some value in the practice of the invention over the same range of aggregate.
c AM silicate is used as an abbreviation for an alkali metal silicate, preferably sodium silicate, having a silicon dioxide to alkali metal oxide mol ratio of from 1 to 2.5. When the silicate used is sodium silicate the ratio of silicon dioxide to sodium oxide is conveniently referred to as a weight ratio because manufacturers of this chemical employ the weight ratio terminology. When sodium silicate is used the most preferred weight ratio for silicon dioxide ($SiO_2$) to sodium oxide ($Na_2O$) is 2.
d Depending on the thickening time desired. For example, 2.6% with 1.5% CMHEC and 40% aggregate (diatomaceous earth for example) in a well 6000 feet deep.
e The weighting agent can be any high density material such as barite, and oxide of iron, lead sulfide, iron phosphide, etc.

The amount of water used to make the slurry may vary widely as long as sufficient water is added to make the slurry fluid and pumpable. For example, the invention is operable with about 40 to 400% water by weight of the dry hydraulic natural cement. It is preferred to use 54% when no diatomaceous earth aggregate is used and 220% is preferred when used with 40% diatomaceous earth aggregate, and other mixtures in proportion. Simple tests can be used to determine if there is enough water present to make a pumpable slurry without substantially increasing the water loss. River water can usually be employed, as the invention is not sensitive to the amount of salts, silt, or clay, in river water which has stood in a tank long enough to drop excess mud, and is not hurt much by that much mud even if not removed.

The bentonite employed may be either hydrated or unhydrated bentonite as weighed in the unhydrated normal state in which bentonite is generally sold and shipped. While it is preferred to use the best commercial grade of unhydrated Wyoming bentonite, any bentonite such as El Paso surface clay, Wilmington slough clay, and all bentonitic clay containing a high percentage of montmorillonites, particularly the sodium salt of montmorillonite, are suitable, and the calcium or other salts of montmorillonites give valuable results in the practice of the invention of the same nature as the sodium salt in somewhat less degree.

The aggregate in Table I is preferably diatomaceous earth, any fairly good grade of the same being suitable. The "Celite" brand of diatomaceous earth is preferred but any technical grade of diatomaceous or infusorial earth such as Kiselguhr, guhr, diatomite, tripolite, tellurine, tetta silicea, ceyssatite, or fossil flour may be employed. In addition somewhat inferior but nevertheless valuable results may be obtained by the practice of this invention by employing other porous aggregates such as pumice, vermiculite, exfoliated vermiculite, popped pumice, and other lightweight aggregates known to the prior art in amounts similar to those given in Table I for diatomaceous earth (Celite).

Acid carboxymethyl hydroxethyl cellulose mixed ether may be made from cellulose by reacting to form the carboxymethyl portion first and then the hydroxyethyl portion, or vice versa, or both at once. Reacting ethylene oxide with alkali cellulose is the commercial way to make hydroxyethylcellulose, see page 422 of the book "Cellulose Chemistry" by Heuser (1946) (John Wiley & Sons Inc., New York). Other methods are mentioned on page 423 of said book. On pages 421 and 422 of said book, the preparation of carboxymethylcellulose (also known as glycolic acid ether of cellulose) is disclosed.

Sodium carboxymethyl hydroxyethyl cellulose mixed ether can be represented by the following formula

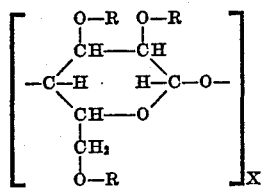

where X represents the number of anhydroglucose units per molecule of polymer and each R can be hydrogen, a —$C_2H_4OH$ group, or a —$CH_2COONa$ group. The substitution of both types of groups, i.e., —$C_2H_4OH$ and —$CH_2COONa$, need not be on the same anhydroglucose unit of the molecule; sometimes it is, and sometimes not. Nor is it necessary that all the anhydroglucose units in the molecule be reacted with ether, as those units which are so reacted will make the molecule active as a cement additive. It is preferred to have a combined substitution of carboxymethyl and hydroxyethyl radicals per anhydroglucose unit averaging from 0.5 to 1.75 in which the carboxymethyl radicals average from 0.15 to 1.2 and the hydroxyethyl radicals average from 0.35 to 1.35 but valuable results are still obtained outside of this range, especially if the mixed ether is water-soluble, or will hydrolyze to give water-soluble salts. The above sodium carboxymethyl hydroxyethyl cellulose mixed ether can be converted to acid carboxymethyl hydroxyethyl cellulose mixed ether by reaction with an acid such as nitric acid and removal of the resulting sodium nitrate or other salt by purification, if purification is desired. When used in cement according to the present invention, such purification is not always necessary.

"Viscosity Grade" is a term sometimes employed in identifying samples of CMHEC. The so-called viscosity grade is defined in terms of the viscosity (expressed in centipoise) at 25° C. of an aqueous solution of the sodium salt of CMHEC). Solutions containing two percent by weight of CMHEC in water are used when the viscosity grade is less than about 1000 cp. For higher viscosity grades, the values are obtained using a one percent solution. Viscosity grade is believed to be a measure of the molecular weight or particle size distribution. However, the exact relationship between these two factors is not presently known, and other factors, such as the pH of the solution and the concentration of other electrolytes in the solution may affect the result. I have found that for relatively pure (90%) samples of the sodium salt of CMHEC which give solutions having a pH between about 5 and about 10, that viscosity grades between about 20 cp. and 40,000 cp. give satisfactory results for the control of water losses from aqueous cement slurries. High viscosity grades, while more difficult to disperse in the cement slurry, minimize the tendency of solids to settle from the slurry.

When the CMHEC is to be dry blended with the dry cement, it is preferred that the CMHEC be ground to a particle size less than 20 mesh, preferably less than 80 mesh. When the CMHEC is to be predissolved in the mixing water, or if the cement slurry is to be prepared from a dry blend of cement and CMHEC employing adequate agitation, then the particle size of the CMHEC is less important.

The alkali metal silicates of Table I, preferably sodium, potassium and lithium silicates, are most preferably sodium silicates having a silicon dioxide ($SiO_2$) to sodium oxide ($Na_2O$) weight ratio of from 1 to 2.5, preferably 1.6 to 2.5, and most preferably 2, because the latter figure gives good results in acceleration with the least detrimental effect on water loss. While said alkali metal silicates can be used as an anhydrous salt, a hydrated salt containing various amounts of water of hydration, and as predissolved solutions, the use of anhydrous salts and particularly sodium silicate dry anhydrous salt is preferred for dry blending with the cement. Alkali metal silicates, for example sodium silicates with these $SiO_2$ to $Na_2O$ ratios, are not compounds having a definite formula, but are intimate mixtures of molecular structures averaging such ratios. For example metasilicate $Na_2SiO_3$, disilicate $Na_2Si_2O_5$, tetrasilicate $Na_2Si_4O_9$ and many other silicates of different ratios may be present. It is operable to use from 0.1 to 15%, preferably 0.3 to 7%, of the alkali metal silicate, but the amount employed depends on the thickening time desired and the amount of CMHEC present and generally the deeper the well the less silicate need be used, and the shallower the well the more will be used. It is easy to make simple batch tests of sample mixtures of the cement at the well site before actually employing the cement and anyone skilled in the art can make these tests. However, the amount employed may be readily estimated from the data given in this application and good results will be obtained without such tests.

The following examples will serve to further illustrate the invention. Certain procedures employed in the execution of the examples are described as follows:

The thickening time is a measure of how long the cement slurry can remain fluid and hence pumpable. If the thickening time is too short to permit placement in the well, a successful cementing job will not be obtained; and remedial practices, costly in time and money, must be resorted to. Two measures of the thickening time are employed by those skilled in the art. Thickening times at atmospheric pressure are measured in Halliburton consistometers. The cement slurry is placed in a cylindrical cup which is rotated. The viscosity of the slurry is registered by measuring the torque on a paddle contained in the cup. For this atmospheric pressure test, the slurry is heated at a rate of approximately 2° per minute until the desired final temperature is reached, which temperature is then maintained. The time required for the slurry to reach 100 poises is called the thickening time and is dependent upon both temperature and pressure.

Thickening times determined at atmospheric pressure cannot be reliably applied to actual well conditions. To establish closely the thickening time of the cement slurry under actual well conditions, the test should simulate the conditions of temperature and pressure which will be encountered in the well. The super-pressure (Stanolind) thickening times are determined in a manner analogous to those employed with the Halliburton equipment, except that the temperature and pressure are increased at a linear rate during the initial portion of the test. When the pressure and temperature have reached the values desired, they are held at those values until the slurry thickens, i.e., reaches a consistency of 100 poises. Specific details relating to these thickening time tests are given in API Code RP 10B entitled, "Recommended Practice for Testing Oil Well Cements," third edition, API Division of Production, Dallas, Texas, April 1953.

The compressive strength is determined upon samples of the slurry which have been cured to two-inch cube molds. The curing can be done at either atmospheric pressure at the desired temperature, or by simulating the pressure and temperature conditions which are encountered in the well. The atmospheric pressure determinations are described in the previously mentioned API Code 10B. The compressive strengths developed under simulated well conditions were determined, according to the procedure developed by API workers and incorporated in the Fifth Edition of the API Code 10B, issued May 1956.

The water loss values were determined according to the procedure employed with drilling muds as fully described in API Code 29, "Recommended Practice on Standard Procedure of Testing Drilling Fluids," third edition, API Division of Production, Dallas, Texas, May 1950. For the test, a portion of the slurry is poured in a filter press and filtered under 100 p.s.i.g. If other than the initial water loss were to be determined, the slurry was aged in a closed container for the desired time. Unless otherwise stated, the aging was performed at ambient temperature, generally 70–85° F.

Except where otherwise stated the cement composition slurries were prepared by dry blending the dry ingredients on a roller blender. The dry blend was added to a measured amount of water and slurried with a Waring Blendor or with a Kitchen Aid mixer in accordance with the procedure described in API Code RP 10B. Full details regarding such blending procedures can be found in the said code.

In a few instances herein data are included in the same series of runs in an example from different lots of cement. These instances have occurred in situations where it was desirable to fill in "gaps" in order to more fully illustrate the invention. Such instances are plainly indicated. As will be understood by those skilled in the art there will frequently be slight variations between different lots of cement, even from the same manufacturer. Where necessary for a proper interpretation of the data (as in Table II) control tests on both lots of cement are included.

Example A

The following tests in Table II show that Portland cement to which 0.5% by weight, of the dry Portland cement, of sodium carboxymethyl hydroxyethyl cellulose mixed ether and 54% water has been added to form an aqueous pumpable slurry, had a water loss of 7.5 ml. in 30 minutes at 100 pounds per square inch pressure in the standard drilling mud filtration tests, and this water loss was not increased any by the addition of 2% of sodium silicate in run No. 2 whereas the noted percentages of other metal salts raised the water loss of the same cement-CMHEC aqueous slurry as high as 100 to 485 ml. except for sodium aluminate in run No. 8, discussed further below.

TABLE II

WATER LOSS TESTS

| Run No. | Accelerator Type | Additive percent | Water Loss, ml./30 min. | Halliburton Thickening Time at 180° F., hr.: min. |
|---|---|---|---|---|
| 1 | None | 0.0 | 7.5 | 18 hr., 44 min. |
| 2A | Sodium silicate [1] | 1.0 | | 4 hr., 21 min. |
| 2 | do [1] | 2.0 | 7.5 | |
| 3 | do [2] | 1.0 | 7.5 | 4 hr., 28 min. |
| 4 | $MgCl_2$ | 2.0 | 252 | |
| 5 | $NH_4Cl$ | 2.0 | 101 | |
| 6 | $FeCl_2$ | 2.0 | 395 | |
| 7 | $CuCl_2$ | 2.0 | 485 | |
| 8A | $NaAlO_2$ | 0.0 | | 14 hr., 55 min.[3] |
| 8 | $NaAlO_2$ | 1.0 | 10 | |
| 8B | $NaAlO_2$ | 2.0 | | 11 hr., 55 min.[3] |
| 8C | $NaAlO_2$ | 3.0 | | 3 hr., 20 min.[3] |
| 9 | $CaCl_2$ | 0.5 | 249 | |
| 10 | $CaCl_2$ | 1.0 | 275 | |
| 11 | $CaCl_2$ | 2.0 | 350 | 5 hr., 12 min. |
| 12 | $CaCl_2$ | 4.0 | 414 | |
| 13 | NaCl | 1.0 | | 14 hr., 36 min. |
| 14 | NaCl | 2.0 | | 13 hr., 30 min. |
| 15 | $Na_2SO_4$ | 0.5 | 7 | 14 hr., 55 min. |
| 16 | $MgSO_4$ | 0.5 | 9 | 16 hr., 6 min. |

[1] Silicon dioxide to sodium oxide weight ratio of 2 to 1.
[2] Silicon dioxide to sodium oxide weight ratio of 2 to 3.
[3] Values determined on a lot of cement different from that used for all other tests in this table.

A comparison of runs 1, 2, 2A, and 3 shows that sodium silicate is very effective in decreasing the thickening time; yet it has no effect on the water loss values. For example, the thickening time is decreased by about 76.5 percent using 1.0 percent silicate. Thus sodium silicate is an excellent set accelerator to use in conjunction with CMHEC, which as previously pointed out, frequently retards the set too much. Therefore the combination of CMHEC plus sodium silicate is an excellent combination for use when it is desired to control both water loss and thickening time because the advantageous water loss reducing property of CMHEC can be utilized without the disadvantage of increasing the thickening time (time of set) beyond desired values.

Calcium chloride ($CaCl_2$) which is usually used as a cement set accelerator or thickening time decreaser increased the water loss by too great an amount in Table II and therefore could not be employed to accelerate a CMHEC containing Portland cement. The same is true of all the other prior art set accelerators, such as ammonium, iron, copper and magnesium chloride. Run No. 8 indicates that sodium aluminate was approximately as good as sodium silicate insofar as its effect on water loss is concerned. However, a comparison of run 8A with run 8B shows that 2.0 percent of sodium aluminate reduced the thickening time by only about 32.4 percent. Run 8C confirms that sodium aluminate is not as effective a set accelerator as sodium silicate. Alkali metal aluminates are claimed in a copending application of another inventor but the same assignee, Serial No. 473,174 filed December 6, 1954, now Patent No. 2,880,096.

Example B

Table III gives examples of some of the various proportions of materials which are useful in the practice of the present invention within the ranges of Table I in different depth wells.

TABLE III
PARTS BY WEIGHT OF MATERIALS

| Materials in the Cement Slurry | (Depth of well in feet) | | | |
|---|---|---|---|---|
| | 6,000', Parts | 12,000', Parts | 14,000', Parts | 16,000', Parts |
| Portland Cement | 100 | 100 | 100 | 100 |
| Celite | 30 | 20 | 0 | 40 |
| Bentonite | 2 | 2 | 0 | 2 |
| NaCMHEC | 1.5 | 1 | 0.7 | 2 |
| AM Silicate | 7 | 3 | 2 | 2 |
| Water | 150 | 125 | 55 | 220 |

The above proportions of materials in Table III show how considerable variation in composition can be employed in practicing the invention. The 14,000 foot well composition is given as an example where no Celite nor bentonite is employed, in which case the slurry runs about 15 pounds per gallon, and the Halliburton thickening time to 100 poises is about 5 hours.

Example C

A well 5963 feet deep was drilled with a water-base mud and casing was cemented at that depth. It was desired to cement the casing with a cement slurry having density roughly about the same as the drilling mud, or for example within 2 pounds per gallon of the weight of the mud used to drill the well. Drilling mud weights run from 8.3 to 20 pounds per gallon and the drilling mud in this particular well was in the neighborhood of 10 to 11 pounds per gallon.

The cement slurry composition was made up of 100 parts by weight Portland cement, 40 parts diatomaceous earth (Celite), 2 parts bentonite, 1.5 parts sodium carboxymethyl hydroxyethyl cellulose mixed ether, 2.6 parts sodium silicate and 220 parts water. The usual simple tests made on the slurry showed a water loss of 15 ml. in 30 minutes, a Halliburton thickening time at 180° F. of 5 hours 30 minutes and a density of 11.05 pounds per gallon.

This density of 11.05 pounds per gallon was achieved by using the "Filter-Cel" grade of "Celite" brand diatomaceous earth.

The compressive strength of the cement setting at 140° F. was 440 p.s.i. in 24 hours which rose to 900 p.s.i. in 72 hours, while at a setting temperature of 160° F. the compressive strength after 24 hours was 793 p.s.i. and after 72 hours was 1100 p.s.i.

The well was completely cemented.

Cement slurries having different densities can be obtained by employing different grades of diatomaceous earth. For example, diatomaceous earth in the form of diatomite may be mined in the Lompoc Hills area of California and may be merely coarsely ground, with or without calcination, the grinding being coarse enough to preserve substantially at least a major portion of the structure of the diatom siliceous skeletons, if the lighter weights of cement are preferred, or it may be ground to different degrees of fineness, with or without calcination, to produce heavier cement slurries employing less water. Some reduction in weight and considerable reduction in the amount of water required can be obtained when the diatomite is ground so fine that the diatom siliceous structure is completely destroyed, and aqueous cement slurries prepared according to the above disclosure are still useful in the practice of the present invention.

Example D

A series of cement composition aqueous slurries having the following composition were prepared:

| | Parts by weight |
|---|---|
| Portland cement | 100 |
| NaCMHEC | 0.5 |
| Water | 54 |

Water loss and thickening time tests were run on the said slurries. The results of these tests are given in Table IV.

TABLE IV

| Run No. | NaCMHEC | | | Water-Loss, ml./30 Min. | Thickening Time, API 14,000 ft. Well Test |
|---|---|---|---|---|---|
| | Viscosity Grade | DS[1] of CM | DS[1] of HE | | |
| 1 | 21 | 0.38 | 0.67 | 46 | |
| 2 | 55 | 0.32 | 0.56 | 8 | 4 hr., 35 min. |
| 3 | 130 | 0.38 | 0.81 | 8 | 4 hr., 24 min. |
| 4 | 190 | 0.34 | 0.89 | 7 | 4 hr., 55 min. |
| 5 | 400 | 0.42 | 0.69 | 8 | 4 hr., 35 min. |
| 6 | 1,100 | 0.36 | 0.65 | 9 | 5 hr., 44 min. |
| 7 | 40,000 | 0.29 | 0.67 | 8 | |
| 8 | 25 | 0.46 | 0.41 | 15 | |
| 9 | 250 | 0.37 | 0.41 | 18 | |
| 10 | 150 | 0.35 | 0.45 | 19 | |

[1] Degree of substitution of carboxymethyl (CM) or hydroxyethyl (HE).

The results of the tests in Table IV show that NaCMHEC having a wide range of viscosity grade can be employed to prepare cement slurries having excellent water loss and thickening time values. Other presently available low water-loss cements generally have water-loss values greater than 100 ml. It is to be noted that the highest value obtained in the above tests (Run No. 1) is only 46 ml.

The data in Table IV-A further illustrate the properties of cement composition slurries having the composition given in Example D except (1) the concentration of the NaCMHEC is varied and (2) a different lot of cement was employed.

TABLE IV-A

| Run No. | CMHEC, Parts by Wt. | API Depth, Ft. | API Time to Place, Hr.:Min. | API Thickening Time, Hr.:Min. |
|---|---|---|---|---|
| 1 | 0.2 | 10,000 | 1:05 | 4:40 |
| 2 | 0.3 | 10,000 | 1:05 | 5:22 |
| 3 | 0.5 | 10,000 | 1:05 | >16:00 |
| 4 | 0.3 | 12,000 | 1:14 | 4:57 |
| 5 | 0.5 | 12,000 | 1:14 | 6:04 |
| 6 | 0.7 | 12,000 | 1:14 | 15:00 |
| 7 | 0.3 | 14,000 | 1:24 | 2:43 |
| 8 | 0.5 | 14,000 | 1:24 | 3:38 |
| 9 | 0.7 | 14,000 | 1:24 | 6:31 |
| 10 | 0.5 | 16,000 | 1:31 | 1:43 |
| 11 | 0.7 | 16,000 | 1:31 | 2:04 |

Example E

A series of cement composition aqueous slurries were prepared for comparison purposes and to illustrate the effect of CMHEC upon water loss in slurries of different density. Portland cement was used. These slurries had the compositions given in Table V below. Results of water loss tests on said slurries are also given in Table V.

TABLE V*

| Run No. | Slurry Density, lbs./gal. | NaCMHEC, Percent by wt. of Cement | Celite, Percent by wt. of Cement | Water, Percent by wt. of Cement | Water Loss, ml./30 min. |
|---|---|---|---|---|---|
| 1 | 15 | 0 | 0 | 54 | 600-1,000 |
| 2 | 15 | 0.1 | 0 | 54 | 435 |
| 3 | 15 | 0.2 | 0 | 54 | 90 |
| 4 | 15 | 0.3 | 0 | 54 | 35 |
| 5 | 15 | 0.3 | 0 | 54 | 17 |
| 6 | 15 | 0.5 | 0 | 54 | 7 |
| 7 | 15 | 0.9 | 0 | 54 | 3 |
| 8 | 15 | 0.7 | 0 | a 54 | 5 |
| 9 | 15 | 0.5 | 0 | b 54 | 13 |
| 10 | 15 | 0.5 | 0 | c 54 | 7 |
| 11 | 15 | 0.5 | 0 | d 54 | 9 |
| 12 | 12.4 | 0.5 | 20 | 120 | 33 |
| 13 | 12.4 | 0.7 | 20 | 120 | 18 |
| 14 | 12.4 | 1.0 | 20 | 120 | 13 |
| 15 | 12.4 | 1.5 | 20 | 120 | 7 |
| 16 | 11.1 | 1.0 | 40 | 220 | 31 |
| 17 | 11.1 | 1.5 | 40 | 220 | 17 |
| 18 | 11.1 | 2.0 | 40 | 220 | 12 |
| 19 | 11.1 | 2.5 | 40 | 220 | 8 |
| 20 | 11.1 | 5.0 | 40 | 220 | 4 |
| 21 | 11.1 | 7.5 | 40 | 220 | 3.5 |
| 22 | 11.1 | 10.0 | 40 | 220 | 2.0 |
| 23 | 11.1 | 12.5 | 40 | 220 | 1.2 |
| 24 | 10.5 | 2.5 | 40 | 290 | 9.5 |
| 25 | 10.5 | 5.0 | 40 | 290 | 6 |
| 26 | 10.5 | 7.5 | 40 | 290 | 4 |
| 27 | 10.5 | 10.0 | 40 | 290 | 3 |
| 28 | 10.5 | 15.0 | 40 | 290 | 1.3 |

*These runs made with several different lots of cement and represent typical results obtained with the designated concentrations of CMHEC in slurries of different densities.
a Water contained 10,000 p.p.m. NaCl.
b Water contained 100,000 p.p.m. NaCl.
c Water contained 10,000 p.p.m. $Na_2SO_4$.
d Water contained 10,000 p.p.m. $MgSO_4$.

The results given in the above Table V illustrate that beneficial effects are obtained at CMHEC concentrations as low as 0.1 percent by weight. Water loss values increase as the slurry ages. The extent of the increase is a function of the concentration of CMHEC and the time and temperature of aging. For a slurry being pumped into a well, it is desirable to maintain a low water loss as long as the slurry is being pumped. Therefore, the concentration or amount of CMHEC should be selected with these factors in mind and should be sufficient to give the desired initial value for water loss and to maintain a low water loss while the cement slurry is being pumped. In the practice of the invention, generally speaking, it is preferred that the initial water loss value be below 20 ml. and that the water loss value after pumping the slurry into place in a well, be below 40 ml. However, in some instances, depending upon the cementing job to be accomplished, slurries having water loss values as high as 90 ml. or higher can be used with valuable results. For deep, high temperature wells where it is especially important not only to maintain a low water loss but also to maintain a fluid slurry, concentrations of CMHEC as high as 10 to 15 percent can be used. Runs 8 to 11 show that the presence of some salts has a small effect on the water loss values.

Example F

A series of cement composition slurries were prepared to illustrate and compare the effect of employing anhydrous silicates, hydrated silicate salts and predissolved silicates as accelerators in cement systems employing NaCMHEC as a water loss control agent. Said slurries had the following composition:

| | Parts by weight |
|---|---|
| Portland cement | 100 |
| Celite (diatomaceous earth) | 40 |
| NaCMHEC | 1.5 |
| Bentonite | 2 |
| Sodium silicate | Variable |
| Water | 220 |

The sodium silicates used for these tests were purchased as liquid silicate solutions and as salts which had silica ($SiO_2$) to soda ($Na_2O$) weight ratios ranging from 0.67 to 3.75. For some tests, the silicate was predissolved in the mixing water. For other tests the silicate, as an anhydrous salt or as a hydrated salt, was dry blended with the cement, the Celite and the bentonite. This dry blended mixture was then mixed with the water. The results given in Table VI below show that when the silicate is predissolved in the mixing water, the maximum amount of silicate which can be employed, without having a pronounced adverse affect on the water loss, is in the range of 3 to 4 percent by weight. However, when the silicate is added as an anhydrous salt, blended with the other dry ingredients, the effect on the water loss is small. Some hydrated salts when employed in dry blends give results intermediate between results obtained when anhydrous salts are dry blended with the cement and the results obtained when the silicate is predissolved in the mixing water.

TABLE VI

| Run No. | Sodium Silicate | | | Water-loss, ml./30 min. | | |
|---|---|---|---|---|---|---|
| | Silica to Soda Wt. Ratio ($SiO_2$) ($Na_2O$) | Added as | Wt. Percent of Cement | Initial | Slurry Aged 1 hr. | Slurry Aged 2 hr. |
| 1 | | | 0 | 16 | 21 | |
| 2 | 2.0 | Dry blend of anhydrous salt. | 2 | 15 | 21 | 22 |
| 3 | 2.0 | do | 4 | 17 | 25 | 25 |
| 4 | 2.0 | do | 6 | 18 | 26 | 24 |
| 5 | 2.0 | do | 8 | 17 | 24 | 24 |
| 6 | 2.0 | do | 10 | 16 | 26 | 21 |
| 7 | 2.0 | do | 12 | 16 | 27 | 26 |
| 8 | 2.0 | Dry blend of hydrated salt. | 3 | 20 | 110 | 146 |
| 9 | 2.0 | do | 4 | 119 | 335 | |
| 10 | 2.0 | Predissolved | 3 | 14 | | |
| 11 | 2.0 | do | 3.6 | 217 | | |
| 12 | 1.0 | do | 2 | 20 | | |
| 13 | 1.0 | do | 3 | 30 | | |
| 14 | 1.0 | do | 4 | 161 | | |
| 15 | 0.5 | do | 3.2 | 21 | | |
| 16 | 0.5 | do | 3.4 | 22 | | |
| 17 | 0.5 | do | 3.6 | 217 | | |

NOTE.—Hydrated salt contained 17.5 percent water.

Example G

To further illustrate and compare the effect of the form in which the silicate is used, another series of cement composition slurries having the following composition were prepared:

| | Parts by weight |
|---|---|
| Portland cement | 100 |
| Celite (diatomaceous earth) | 40 |
| NaCMHEC | 1.5 |
| Water | 220 |
| Sodium silicate | Variable |

All of the sodium silicates employed in these tests had a $SiO_2$ to $Na_2O$ weight ratio of 2:1. As indicated in Table VII below, said silicates were added to the cement composition as either (a) an anhydrous powder, (b) predissolved in water or (c) as a hydrated salt.

TABLE VII

| Silicate Added as— | Compressive strength, p.s.i., after 24 hrs. @ 140° F., with indicated percentage silicate | | | | | | | |
|---|---|---|---|---|---|---|---|---|
| | 0% | 1% | 2% | 3% | 5% | 6% | 7% | 8% |
| Anhydrous powder | 0 | 0 | 0 | 35 | 434 | 578 | 669 | 710 |
| Predissolved in water | 0 | 52 | 247 | 549 | | | | |
| Hydrated salt | | | | 476 | | | | |

The results given in Table VII show that when anhydrous sodium silicates are dry blended with the cement, a weaker set cement is obtained than when the same amount of silicate predissolved in the mixing water is used. However, the anhydrous salts can be used in amounts as much as five times the amount of the hydrated or predissolved salts without adverse effect on the water loss. Since the results of Table VI above show that hydrated silicate salts and predissolved silicates, used in amounts above about 3 percent by weight have a pronounced adverse effect on water loss, no compressive strength tests were run on slurries containing more than 3 percent by weight of said hydrated salts or predissolved silicates.

The results of Table VII show that dry blending of the anhydrous silicates with the dry cement is preferred because (1) maximum duration of water loss control is obtained and (2) a maximum early strength for the set cement is obtained.

*Example H*

To further illustrate and compare the effect of silicate to soda weight ratio upon the compressive strength of the set cement, a series of cement composition slurries having the following composition were prepared:

|  | Parts by weight |
|---|---|
| Portland cement | 100 |
| Celite (diatomaceous earth) | 40 |
| Bentonite | 2 |
| NaCMHEC | 1.5 |
| Sodium silicate [1] | 3 |
| Water | 220 |

[1] The silicates were predissolved in the water used to prepare the slurries.

TABLE VIII

| Silica to Soda Wt. Ratio | Silica to Soda Mol Ratio | Compressive Strength,[1] p.s.i., when cured 24 Hrs. | | |
|---|---|---|---|---|
| | | 140° F. | 160° F. | 180° F. |
| 0.67 | 0.68 | 339 | 488 | 778 |
| 1.00 | 1.03 | 415 | 499 | 825 |
| 1.60 | 1.65 | 489 | 757 | 1,046 |
| 2.00 | 2.06 | 539 | 760 | 1,166 |
| 2.50 | 2.58 | 451 | 646 | 666 |
| 3.22 | 3.32 | 468 | 746 | 515 |
| 3.75 | 3.88 | 396 | 662 | 525 |

[1] Compressive strengths are the average of three cubes.

The results given in Table VIII show that sodium silicates having a silica to soda weight ratio within the range of 1.0 to 2.5 are preferred, silicates having a silica to soda weight ratio of 1.6 to 2.5 are more preferred, and that silicates having a silica to soda weight ratio of 2.0 are most preferred.

*Example I*

A series of cement composition aqueous slurries having the following composition were prepared for comparison and illustration of the effect of the sodium silicate accelerator upon thickening time of cement slurries containing CMHEC. The compositions of said slurries were as follows:

|  | Parts by weight |
|---|---|
| Portland cement | 100 |
| Celite (diatomaceous earth) | 20 |
| NaCMHEC | 1.0 |
| Bentonite | 2.0 |
| Sodium silicate | Variable |
| Water | 120 |

The results of thickening time tests carried out under simulated well conditions on said slurries, and a similar second series containing a larger amount of NaCMHEC are given in Tables IX and X, respectively, below.

TABLE IX

| Simulated Depth, Feet | Silicate Concentration, wt. percent | API Thickening Time, hours:minutes |
|---|---|---|
| 16,000 | 0 | 1:53 |
| 16,000 | 1 | 1:30 |
| 14,000 | 0 | 2:56 |
| 14,000 | 1 | 1:48 |
| 14,000 | 3 | 1:36 |
| 12,000 | 0 | 4:07 |
| 12,000 | 1 | 2:24 |
| 12,000 | 5 | 1:24 |
| 12,000 | 7 | 1:16 |
| 10,000 | 3 | 2:30 |
| 10,000 | 5 | 2:19 |
| 10,000 | 7 | 1:55 |
| 10,000 | 10 | 1:18 |
| 8,000 | 5 | 2:38 |
| 8,000 | 7 | 2:50 |

A second series of cement composition slurries having the following composition was prepared:

|  | Parts by weight |
|---|---|
| Portland cement | 100 |
| Celite (diatomaceous earth) | 40 |
| NaCMHEC | 1.5 |
| Bentonite | 2 |
| Sodium silicate | Variable |
| Water | 220 |

TABLE X

| Simulated Depth, Feet | Silicate Concentration, wt. percent | API Thickening Time, hours:minutes |
|---|---|---|
| 16,000 | 0.0 | 2:18 |
| 16,000 | 3.0 | 2:01 |
| 16,000 | 5.0 | 1:26 |
| 16,000 | 7.0 | 1:02 |
| 14,000 | 0.0 | 4:06 |
| 14,000 | 3.0 | 2:22 |
| 14,000 | 5.0 | 1:43 |
| 14,000 | 7.0 | 1:16 |
| 12,000 | 3.0 | 4:16 |
| 12,000 | 5.0 | 1:56 |
| 12,000 | 7.0 | 1:42 |
| 10,000 | 5.0 | 5:24 |
| 10,000 | 7.0 | 3:33 |
| 8,000 | 7.0 | 9:35 |

The sodium silicate employed in the cement compositions given in Tables IX and X above was in powdered anhydrous form and had a silicate to soda weight ratio of 2.0. The results given in said Tables IX and X show that the sodium silicate can be used in concentrations ranging up to 10 percent at least and that concentrations ranging up to 7% are preferred in most instances.

*Example J*

A series of cement composition slurries having the following composition were prepared:

|  | Parts by weight |
|---|---|
| Portland cement | 100 |
| NaCMHEC | 0.5 |
| Water | 54 |
| Sodium silicate | Variable |

The sodium silicate was in powdered anhydrous form and had a silica to soda weight ratio of 2. Table XI below gives results of API thickening time tests on said slurries.

TABLE XI

| Sodium Silicate, pts. by wt. | API Well Depth, ft. | API Thickening Time, hr:min. |
|---|---|---|
| 0 | 14,000 | 4:0 |
| 1 | 14,000 | 3:20 |
| 3 | 14,000 | 2:14 |

The data in Table XI show that sodium silicate can be used to control thickening time of 15 lb./gal. density cement slurries containing no diatomaceous earth. Sodium silicate can also be used to control thickening times of neat cement slurries containing no CMHEC or diatomaceous earth.

*Example K*

Table XII given below shows the effect of bentonite on Portland cement slurries having the following parts by weight composition: Portland cement 100, Celite (diatomaceous earth) 40, CMHEC 1.5, sodium silicate 3.0 (soda to silicate ratio 2.0), and water 220.

TABLE XII

| Bentonite, percent | Halliburton Thickening Time at 180° F. hrs./min. | Compressive Strength when Cured 24 hours at 160° F., p.s.i. |
|---|---|---|
| 0 | 5:41 | 534 |
| 1 | 5:28 | 643 |
| 2 | 4:53 | 661 |
| 3 |  | 665 |
| 4 | 5:01 | 637 |

While diatomaceous earth (Celite) is the principal bulking agent, it is sometimes desirable to add bentonite to the cement slurry in order to attain or develop early strength. Table XII above shows that the early strength developed by the cement is at a maximum with bentonite concentrations between 2 and 4 percent. Bentonite concentrations higher than 4 percent cause a marked reduction in the compressive strength. The data given in Table XII show that bentonite has no pronounced effect on the thickening time.

Any material which is used to effect density reduction of a cement slurry must either have a density appreciably lower than cement ($d$=about 3.17 g./cc.) or allow more water to be added. Diatomaceous earth has a density of about 2.07 g./cc. so that some decrease in slurry density results from the low density of the diatomaceous earth compared with the density of the cement.

However, the major function of the diatomaceous earth is to permit the addition of more water. Minimum and maximum water contents for mixtures of diatomaceous earth and cement have been determined to establish the operable density range for different mixtures. The maximum water content can be defined as the largest percent which can be contained in the slurry without resulting in appreciable settling of the solids in the slurry or excessive bleeding of water at the surface of the slurry. The minimum water content can be defined as the least amount which can be used without exceeding a consistency of 25 to 30 poises during the first fifteen minutes as determined with the high pressure consistometer (API Code 10B, 5th ed.). Table XIII below shows maximum and minimum water contents for slurries of Portland cement and diatomaceous earth (Celite).

TABLE XIII

| DE, percent | Water, percent | | Slurry Density, lb./gal. | |
|---|---|---|---|---|
|  | Min. | Max. | at max. Water | at min. Water |
| 0 | 40 | 63 | 14.4 | 16.3 |
| 10 | 80 | 110 | 12.5 | 13.6 |
| 20 | 110 | >140 | <11.95 | 12.7 |
| 40 | 170 | >280 | <10.6 | 11.7 |

It is evident from the results given in Table XIII that the use of diatomaceous earth permits the use of considerably more water than would otherwise be possible. For example, cement slurry systems containing about 40 percent diatomaceous earth can contain up to about 80 to 87 percent water by volume. Cement slurry systems containing about 20 percent diatomaceous earth can contain up to about 73 to 78 percent water by volume. A typical neat cement slurry system can contain up to only about 56 to 67 percent water by volume.

As mentioned above, valuable results can be obtained in the practice of the invention when employing a wide variety of diatomaceous earths. However, not all diatomaceous earths are equivalent because not all diatomaceous earths will permit the use of sufficient water to obtain the desired low densities. This is shown by the following examples wherein the maximum amount of water which could be added without causing excessive bleeding was determined for seventeen different diatomaceous earths.

*Example L*

Weighed amounts of the candidate diatomaceous earth and Portland cement were dry blended on a roller blender. The blend was added to a measured amount of water and slurried for 25 seconds in a Waring Blendor in accordance with the procedure described in API Code RP 10B. The Blendor was connected to an automatic timer to insure constant time of mixing. Slurry densities were measured with a mud balance. Bleeding values for the different slurries were determined by placing 250 milliliters of slurry in a 250 ml. graduated mixing cylinder having an internal diameter of 3.7 cm. ±0.3 cm. and allowing it to stand at room temperature (70 to 85° F.) for three hours. Any supernatant water at the surface of the slurry was recorded as ml. of bleeding. To obtain a more accurate reading, the supernatant liquid was transferred to a 10 or 25 ml. cylinder for measuring. The amount of bleeding under these conditions should be less than 1 percent by volume and the upper and lower portion of the slurry should have the same density to within ±0.1 pound per gallon. The term "bleeding value" as used herein and in the claims is defined as the volume of water in milliliters which separates from 250 ml. of the slurry as supernatant liquid when the slurry is allowed to remain quiescent for three hours at 70–85° F. in a 250 ml. graduated mixing cylinder having an internal diameter of 3.7 cm. ±0.3 cm. The preferred maximum bleeding value is less than 2.5 and in all cases, the maximum bleeding value should not exceed 3.0. Table XIV below gives the results of bleeding value tests for 14 of the diatomaceous earths tested. In all cases, 100 parts by weight of cement were used.

TABLE XIV

| Diatomaceous Earth | | Water, Parts by Weight | Density, lb./gal. | Bleeding Value Free Water, ml. |
|---|---|---|---|---|
| No. | Parts by Wt. | | | |
| 1 | 20 | 140 | 11.8 | 14 |
| 1 | 20 | 130 | 12.2 | 8 |
| 1 | 20 | 130 | 12.1 | 12 |
| 2 | 20 | 130 | 12.1 | 14 |
| 3 | 20 | 130 | 11.9 | 10 |
| 4 | 20 | 130 | 11.8 | 0 |
| 4 | 20 | 140 | 11.8 | 1 |
| 4 | 20 | 130 | 12.0 | 0 |
| 1 | 40 | 210 | 11.2 | 14 |
| 2 | 40 | 210 | 11.0 | 23 |
| 3 | 40 | 210 | 11.1 | 7 |
| 4 | 40 | 210 | 10.9 | 0 |
| 4 | 40 | 220 | 10.85 | 0 |
| 4 | 40 | 230 | 10.8 | 1 |
| 4 | 40 | 240 | 10.7 | 4 |
| 4 | 40 | 230 | 10.85 | 1 |
| 5 | 40 | 230 | 10.85 | 1 |
| 6 | 40 | 230 | 10.9 | 28 |
| 7 | 40 | 230 | 11.0 | 25 |
| 8 | 40 | 230 | 11.0 | 25 |
| 9 | 40 | 230 | 11.0 | 28 |
| 10 | 40 | 230 | 10.8 | 2 |
| 11 | 40 | 230 | 11.0 | 7 |
| 12 | 40 | 220 | 10.95 | 8 |
| 13 | 40 | 220 | 10.95 | 2 |
| 14 | 40 | 220 | 11.05 | 4 |
| 4 | 60 | 320 | 10.3 | 2 |
| 4 | 60 | 310 | 10.4 | 0 |

It is evident from a comparison of the data given in

Table XIV that the diatomaceous earths are not equivalent. Of the fourteen diatomaceous earths tested, only four i.e., Nos. 4, 5, 10, and 13 are acceptable. In all of the others, the amount of water which separated was excessive. Diatomaceous earth No. 4 is the Celite brand of diatomaceous earth used in those examples herein wherein only one diatomaceous earth is mentioned.

*Example M*

A series of cement composition slurries containing 100 parts by weight of Portland cement, 40 parts by weight of different candidate diatomaceous earths, and water in the amounts shown in Table XV below, were prepared to compare three additional diatomaceous earths with diatomaceous earth No. 4. The said slurries were tested in the manner described in Example K. The results of these tests are given in Table XV below.

TABLE XV

| Diatomaceous Earth No. | Water, parts by wt. | Density, lb./gal. | Bleeding Value, Free Water, ml. |
|---|---|---|---|
| 4 | 210 | 11.2 | 0 |
| 15 | 210 | 11.2 | 1 |
| 16 | 210 | 11.2 | 3.5 |
| 17 | 210 | 11.25 | 2 |
| 4 | 220 | 11.05 | 1 |
| 15 | 220 | 11.05 | 2.5 |
| 16 | 220 | 11.05 | 6.5 |
| 17 | 220 | 11.12 | 2.5 |
| 4 | 230 | 10.95 | 0 |
| 15 | 230 | 10.95 | 2 |
| 16 | 230 | 10.95 | 8 |
| 17 | 230 | 11.0 | 3 |
| 4 | 240 | 10.8 | 0.5 |
| 15 | 240 | 10.95 | 2 |
| 16 | 240 | 10.85 | 10 |
| 17 | 240 | 10.9 | 4 |
| 4 | 250 | 10.65 | 1.5 |
| 15 | 250 | 10.7 | 3 |
| 16 | 250 | 10.7 | 12 |
| 17 | 250 | 10.75 | 6 |
| 4 | 260 | 10.6 | 2 |
| 15 | 260 | 10.6 | 3.5 |
| 16 | 260 | 10.6 | 15 |
| 17 | 260 | 10.65 | 8 |
| 4 | 280 | 10.5 | 3 |
| 15 | 280 | 10.5 | 4.5 |
| 16 | 280 | 10.5 | 20 |
| 17 | 280 | 10.55 | 13 |

A comparison of the data given in Table XV shows that diatomaceous earth No. 16 is clearly not acceptable. Diatomaceous earth No. 15 is acceptable only through the range of 250 parts by weight of water or less, and diatomaceous earth No. 17 is acceptable only through the range of 230 parts by weight of water or less. Diatomaceous earth No. 4 again was acceptable throughout the entire range tested. Thus out of the seventeen diatomaceous earths listed in Tables XIV and XV, only six (35%) i.e., Nos. 4, 5, 10, 13, 15, and 17 are acceptable and Nos. 15 and 17 are acceptable only for a limited range.

Diatomaceous earth Nos. 5, 10, and 15 are highly refined products and while they pass the above bleeding tests for use according to the invention their cost prohibits their use in commercial cement slurries. Thus out of the seventeen diatomaceous earths listed in Tables XIV and XV only three i.e., Nos. 4, 5, and 10, are acceptable without qualification.

*Example N*

A series of cement composition slurries containing 100 parts by weight of Portland cement, 1.5 parts by weight NaCMHEC, 3.0 parts by weight of powdered anhydrous sodium silicate having a silica to soda weight ratio of 2.0, 40 parts by weight of diatomaceous earth, and the amounts of water shown in Table XVI below were prepared. Said slurries were tested for bleeding values in accordance with the procedure given in API Code 29. The results of these tests are given in Table XVI below.

TABLE XVI

| Diatomaceous Earth No. | Water, parts by wt. | Bleeding Value, Free Water, ml. | Initial Water-Loss, ml. in 30 min. |
|---|---|---|---|
| 17 | 180 | 0 | 45 |
| 17 | 200 | 0 | 64 |
| 4 | 220 | 0 | 18 |
| 15 | 220 | 0 | 86 |
| 16 | 220 | 5 | 91 |
| 17 | 220 | 3 | 77 |
| 4 | 240 | 1 | 18 |
| 15 | 240 | 4 | 99 |
| 16 | 240 | 9 | 102 |
| 17 | 240 | 6 | 82 |
| 4 | 260 | 2 | 21 |

A comparison of the data given in Table XVI shows that while diatomaceous earths Nos. 15 and 17 can be used to give valuable results in the low water loss cement systems of the invention because the water loss values are all below 100, the said diatomaceous earths are inferior to diatomaceous earth No. 4. It will be noted that diatomaceous earth No. 4 gave initial water loss values of 18 to 21 whereas diatomaceous earths Nos. 15 and 17 gave water loss values ranging from 45 to 99. Thus it is evident that more CMHEC would be required to give the same water loss value as 1.5 parts by weight of CMHEC gives when used with diatomaceous earth No. 4. The above results clearly indicate that diatomaceous earth No. 4 is more compatible with CMHEC.

Thus the preferred diatomaceous earth for using according to the invention is one which has the property, when mixed with cement and slurried with water in the ranges set out in Table XIII above, of producing a slurry having a bleeding value of not more than three. A more preferred diatomaceous earth is one which also exhibits a high order of compatibility with CMHEC.

The following example illustrates the use of one of the new low density cement systems of the invention in cementing a commercial well in West Texas. At the time the cementing was carried out, it was the longest single stage oil well cement column ever run.

*Example O*

The 7-in. casing was set at 10,335 ft. and cemented with a slurry having a density of 11 lb. per gal. The slurry was prepared by jet mixing with water a dry blend containing 100 parts by weight of Portland cement and 40 parts by weight of diatomaceous earth (Celite). Hole size was 8¾ in. A total of 4,087 cu. ft. of slurry was desired. This allowed for a 20 percent excess or 681 cu. ft. as a precautionary measure based on caliper log measurements.

The blend was mixed with about 25.6 gal. of water per sack of cement. This provided an easily pumpable slurry having an API simulated well thickening time of 3 hours at 10,000 ft. and 230° F. temperature. Some 400 cu. ft. of the excess slurry was circulated out of the well. No stage collars were used. Top of the plug was 9,978 ft.

The cement was drilled out after 24 hours and the open hole acidized from 10,335 to 10,462 ft. with 1,000 gal. acid. The well tested at an average gas rate of 4 million cubic feet per day with some distillate. The cementing job is considered successful in every way.

While several illustrative examples have been given above, the invention is not limited thereto.

Having described my invention, I claim:

1. A cement composition consisting essentially of a major portion of a dry hydraulic natural cement mixed with weight percentages of the weight of said dry hydraulic natural cement of 0.1 to 4% bentonite, 1 to 70% of a lightweight aggregate, 0.1 to 10% of a cement thickening time extending and water loss reducing agent

19 selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and 0.1 to 15% of a cement thickening time reducing agent having substantially no effect on said water loss consisting of an alkali metal silicate having a silicon dioxide to alkali metal oxide mol ratio of from 1 to 2.5.

2. A cement composition consisting essentially of a major portion of a dry hydraulic natural cement mixed with weight percentages of the weight of said dry hydraulic natural cement of 1 to 70% of a lightweight aggregate, 0.1 to 10% of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and 0.1 to 15% of a cement thickening time reducing agent having substantially no effect on said water loss consisting of an alkali metal silicate having a silicon dioxide to alkali metal oxide mol ratio of from 1 to 2.5.

3. A cement composition consisting essentially of a major portion of a dry hydraulic natural cement mixed with small weight percentages of the weight of said dry hydraulic natural cement of 0.1 to 10% of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and 0.1 to 15% of a cement thickening time reducing agent having substantially no effect on said water loss consisting of an alkali metal silicate having a silicon dioxide to alkali metal oxide mol ratio of from 1 to 2.5.

4. A cement composition consisting essentially of a major portion of a dry hydraulic natural cement mixed with small weight percentages of the weight of said dry hydraulic natural cement of 1 to 4% bentonite, 0.1 to 10% of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, and salts of said mixed ethers, and 0.1 to 15% of a cement thickening time reducing agent having substantially no effect on said water loss consisting of an alkali metal silicate having a silicon dioxide to alkali metal oxide mol ratio of from 1 to 2.5.

5. A cement composition consisting essentially of a major portion of Portland cement mixed with small weight percentages of the weight of said dry Portland cement of 1 to 4% bentonite, 0.3 to 3% of a cement thickening time extending and water loss reducing agent consisting of an alkali metal carboxymethyl hydroxyethyl cellulose mixed ether in which the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, and 0.3 to 7% of a cement thickening time reducing agent having

20 substantially no effect on said water loss consisting of sodium silicate having a silicon dioxide to sodium oxide weight ratio of from 1 to 2.5.

6. A cement composition consisting essentially of a major portion of Portland cement mixed with small weight percentages of the weight of said dry Portland cement of 0.3 to 3% of a cement thickening time extending and water loss reducing agent consisting of an alkali metal carboxymethyl hydroxyethyl cellulose mixed ether in which the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, and 0.3 to 7% of a cement thickening time reducing agent having substantially no effect on said water loss consisting of sodium silicate having a silicon dioxide to sodium oxide weight ratio of from 1 to 2.5.

7. A cement composition aqueous slurry consisting essentially of a major portion of a dry hydraulic natural cement mixed with weight percentages of the weight of said dry hydraulic natural cement of 0.1 to 4% bentonite, 1 to 70% of a light weight aggregate, a small amount of a cement thickening time extending and water loss reducing agent sufficient to reduce the water loss of said slurry to less than 40 ml. in 30 seconds when tested according to API Code 29 (third edition, May 1950) water loss test for drilling muds, said agent being selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and a small but effective amount of a cement thickening time reducing agent having substantially no effect on said water loss consisting of an alkali metal silicate having a silicon dioxide to alkali metal oxide mol ratio of from 1 to 2.5; and sufficient water to produce a pumpable slurry.

8. A cement composition aqueous slurry consisting essentially of a major portion of a dry hydraulic natural cement mixed with weight percentages of the weight of said dry hydraulic natural cement of 1 to 70% of a lightweight aggregate, a small amount of a cement thickening time extending and water loss reducing agent sufficient to reduce the water loss properties of said slurry, said agent being selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and a small but effective amount of a cement thickening time reducing agent having substantially no effect on said water loss consisting of an alkali metal silicate having a silicon dioxide to alkali metal oxide mol ratio of from 1 to 2.5; and sufficient water to produce a pumpable slurry.

9. A cement composition aqueous slurry consisting essentially of a major portion of a dry hydraulic natural cement mixed with weight percentages of the weight of said dry hydraulic natural cem entof a small amount of a cement thickening time extending and water loss reducing agent sufficient to reduce the water loss properties of said slurry, said agent being selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and a small but effective amount of a cement thickening time reducing agent having substantially no effect on said water loss consisting of an alkali metal silicate having a silicon dioxide to alkali metal oxide mol ratio of from 1 to 2.5; and sufficient water to produce a pumpable slurry.

10. A cement composition aqueous slurry consisting essentially of a major portion of a dry hydraulic natural cement mixed with weight percentages of the weight of said dry hydraulic natural cement of 1 to 4% bentonite, a small amount of a cement thickening time extending and water loss reducing agent sufficient to reduce the water loss of said slurry to less than 90 ml. in 30 seconds when tested according to API Code 29 (third edition, May 1950) water loss test for drilling muds, said agent consisting of acid carboxyalkyl hydroxyethel cellulose mixed ethers in which the alkyl group contains 1 to 2 carbon atoms, the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, and salts of said mixed ethers, and a small but effective amount of a cement thickening time reducing agent having substantially no effect on said water loss consisting of an alkali metal silicate having a silicon dioxide to alkali metal oxide mol ratio of from 1 to 2.5; and sufficient water to produce a pumpable slurry.

11. A cement composition aqueous slurry consisting essentially of a major portion of Portland cement mixed with weight percentages of the weight of said dry Portland cement of 15 to 50% of diatomaceous earth, 0.3 to 3% of a cement thickening time extending and water loss reducing agent consisting of an alkali metal carboxymethyl hydroxyethyl cellulose mixed ether in which the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, and 0.3 to 7% of a cement thickening time reducing agent having substantially no effect on said water loss consisting of sodium silicate having a silicon dioxide to sodium oxide weight ratio of from 1 to 2.5; and sufficient water to produce a pumpable slurry, said diatomaceous earth having the property of forming an essentially non-settling slurry having a bleeding value of not more than 3 when said other ingredients and said diatomaceous earth are blended with said water to form said slurry.

12. A cement composition aqueous slurry consisting essentially of a major portion of Portland cement mixed with minor weight percentages of the weight of said dry Portland cement of 0.3 to 3% of a cement thickening time extending and water loss reducing agent consisting of an alkali metal carboxymethyl hydroxyethyl cellulose mixed ether in which the total substitution per anhydroglucose unit of the cellulose of carboxymethyl and hydroxyethyl groups is between 0.5 to 1.75, the hydroethyl substitution is from 0.35 to 1.35, and the carboxymethyl substitution is from 0.15 to 1.2, and 0.3 to 7% of a cement thickening time reducing agent having substantially no effect on said water loss consisting of sodium silicate having a silicon dioxide to sodium oxide weight ratio of from 1 to 2.5; and sufficient water to produce a pumpable slurry.

13. In the method of cementing a casing in a well which comprises pumping a cement composition aqueous slurry comprising a hydraulic natural cement into the annular space between the well casing and the borehole and into contact with said casing and an earth formation penetrated by said borehole, the step of adding to the cement composition aqueous slurry weight percentages of the weight of said dry hydraulic natural cement of 0.1 to 4% bentonite, 1 to 70% of a lightweight aggregate, 0.1 to 10% of a cement thickening time extending and water loss reducing agent selected from the group consisting of acid carboxyalkyl hydroethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and 0.1 to 15% of a cement thickening time reducing agent having substantially no effect on said water loss consisting of an alkali metal silicate having a silicon dioxide to alkali metal oxide mol ratio of from 1 to 2.5.

14. In the method of cementing a casing in a well which comprises pumping a cement composition aqueous slurry comprising a hydraulic natural cement into the annular space between the well casing and the borehole and into contact with said casing and an earth formation penetrated by said borehole, the step of adding to the cement composition aqueous slurry weight percentages of the weight of said dry hydraulic natural cement of 1 to 70% of a lightweight aggregate, 0.1 to 10% of a cement thickening time extending and water loss reducing agent selected from the group consisting of acid carboxyalkyl hydroxyethyl cellulose mixed ethers in which the alkyl group contains one to two carton atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and 0.1 to 15% of a cement thickening time reducing agent having substantially no effect on said water loss consisting of an alkali metal silicate having a silicon dioxide to alkali metal oxide mol ratio of from 1 to 2.5.

15. In the method of cementing a casing in a well which comprises pumping a cement composition aqueous slurry comprising a hydraulic natural cement into the annular space between the well casing and the borehole and into contact with said casing and an earth formation penetrated by said borehole, the step of adding to the cement composition aqueous slurry small weight percentages of the weight of said dry hydraulic natural cement of an amount of a cement thickening time extending and water loss reducing agent sufficient to reduce the water loss properties of said slurry, said agent being selected from the group consisting of acid carboxyalkyl hydroxyethyl cellulose mixed ethers in which the alkyl group contains one to two carbon atoms, the total subsitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and a small but effective amount of a cement thickening time reducing agent having substantially no effect on said water loss consisting of an alkali metal silicate having a silicon dioxide to alkali metal oxide mol ratio of from 1 to 2.5.

16. In the method of cementing a casing in a well which comprises pumping a cement composition aqueous slurry comprising a dry hydraulic natural cement into the annular space between the well casing and the borehole and into contact with said casing and an earth formation penetrated by said borehole, the step of adding to the cement composition aqueous slurry small weight percentages of the weight of said dry hydraulic natural cement of 1 to 4% bentonite, a small amount of a cement thickening time extending and water loss reducing agent sufficient to reduce the water loss of said slurry to less than 40 ml. in 30 seconds when tested according to API Code 29 (third edition, May 1950) water loss test for drilling muds, said agent consisting of acid carboxyalkyl hydroxyethyl cellulose mixed ethers in which the alkyl group contains one to two carbon atoms, the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, and salts of said mixed ethers, and a small but effective amount of a cement thickening time reducing agent having substantially no effect on said water loss consisting of sodium silicate having a silicon dioxide to sodium oxide weight ratio of from 1 to 2.5.

17. In the method of cementing a casing in a well which comprises pumping a cement composition aqueous slurry comprising Portland cement into the annular space between the well casing and the borehole and into contact with said casing and an earth formation penetrated by said borehole, the step of adding to the cement composition aqueous slurry small weight percentages of the weight of said dry Portland cement of 0.3 to 3% of a cement thickening time extending and water loss reducing agent consisting of an alkali metal carboxymethyl hydroxyethyl cellulose mixed ether in which the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, and 0.3 to 7% of a cement thickening time reducing agent having substantially no effect on said water loss consisting of powdered anhydrous sodium silicate having a silicon dioxide to sodium oxide mol ratio of from 1 to 2.5.

18. In the method of cementing a casing in a well which comprises pumping a cement composition aqueous slurry comprising Portland cement into the annular space between the said casing and the borehole and into contact with said casing and an earth formation penetrated by said borehole, the step of adding to the cement composition aqueous slurry 15 to 70% of the dry weight of said Portland cement of diotamaceous earth ground coarsely enough to substantially preserve the major portion of the siliceous structure of the diatoms therein, said diatomaceous earth having the property of forming an essentially non-settling slurry having a bleeding value of not more than 3 when blended with said slurry.

19. A well cementing composition consisting of a Portland cement aqueous pumpable slurry consisting essentially of Portland cement and from 15 to 70% of a dry weight of said Portland cement of diatomaceous earth ground coarsely enough to substantially preserve the major portion of the siliceous structure of the diatoms therein, said diatomaceous earth having the property of forming an essentially non-settling slurry having a bleeding value of not more than 3 when said cement and said diatomaceous earth are blended with sufficient water to produce said slurry.

20. A well cementing composition aqueous slurry consisting essentially of a major portion of Portland cement mixed with weight percentages of the weight of said dry Portland cement of 15 to 50% of diatomaceous earth, 0.3 to 3% of a cement thickening time extending and water loss reducing agent consisting of an alkali metal carboxymethyl hydroxyethyl cellulose mixed ether in which the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2 and sufficient water to produce a pumpable slurry, said diatomaceous earth having the property of forming an essentially non-settling slurry having a bleeding value of not more than 3 when said other ingredients and said diatomaceous earth are blended with said water to form said slurry.

21. In the method of cementing a casing in a well which comprises pumping a cement composition aqueous slurry comprising Portland cement into the annular space between the well casing and the borehole and into contact with said casing and an earth formation penetrated by said borehole, the step of adding to the cement composition aqueous slurry 15 to 70% of the dry weight of said Portland cement of diatomaceous earth ground coarsely enough to substantially preserve the major portion of the siliceous structure of the diatoms therein, said diatomaceous earth having the property of forming an essentially non-settling slurry having a bleeding value of not more than 3 when blended with said slurry; and from 0.1 to 4% bentonite.

22. A well cementing composition consisting of a Portland cement aqueous pumpable slurry consisting essentially of Portland cement and from 15 to 70% of a dry weight of said Portland cement of diatomaceous earth ground coarsely enough to substantially preserve the major portion of the siliceous structure of the diatoms therein, said diatomaceous earth having the property of forming an essentially non-settling slurry having a bleeding value of not more than 3 when said cement and said diatomaceous earth are blended with sufficient water to produce said slurry; and from 0.1 to 4% bentonite.

23. A well cementing composition aqueous slurry consisting essentially of a major portion of a dry hydraulic natural cement mixed with weight percentages of the weight of said dry hydraulic natural cement of 0.1 to 5% bentonite, 15 to 70% of diatomaceous earth ground coarsely enough to substantially preserve the major portion of the siliceous structure of the diatoms therein and having the property of forming an essentially non-settling slurry having a bleeding value of not more than 3 when blended with water and the other ingredients recited herein to produce said slurry, a small amount of a cement thickening time extending and water loss reducing agent sufficient to reduce the water loss of said slurry to less than 40 ml. in 30 seconds when tested according to API Code 29 (third edition, May 1950) water loss test for drilling muds, said agent being selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2 and salts of said mixed ethers, and sufficient water to produce a pumpable slurry.

24. In the method of cementing a casing in a well which comprises pumping a cement composition aqueous slurry comprising Portland cement into the annular space between said casing and the borehole and into contact with said casing in an earth formation penetrated by said borehole, the step of adding to said cement composition aqueous slurry from 20 to 40 percent of the dry weight of said Portland cement of diatomaceous earth ground coarsely enough to substantially preserve the major portion of the siliceous structure of the diatoms therein, said diatomaceous earth having the property of forming an essentially non-settling slurry having a bleeding value of not more than 3 when blended with said slurry.

25. A well cementing composition consisting of a Portland cement aqueous pumpable slurry consisting essentially of Portland cement, water, and from 20 to 40 percent of the dry weight of said Portland cement of diatomaceous earth ground coarsely enough to substantially preserve the major portion of the siliceous structure of the diatoms therein, said diatomaceous earth having the property of forming an essentially non-settling slurry having a bleeding value of not more than 3 when said cement and said diatomaceous earth are blended with sufficient of said water to produce said slurry.

26. A method of cementing a casing in a well which comprises pumping a cement composition aqueous slurry into the annular space between said casing and the borehole and into contact with said casing and an earth formation penetrated by said borehole, said cement composition aqueous slurry consisting essentially of a major portion of Portland cement, from 110 to 280 percent of the dry weight of said Portland cement of water, and from 20 to 40 percent of the dry weight of said Portland cement of diatomaceous earth ground coarsely enough to substantially preserve the major portion of the siliceous structure of the diatoms therein, said diatomaceous earth having the property of forming an essentially non-settling slurry having a bleeding value of not more than 3 when blended with said cement and said water to produce said slurry.

27. A well cementing composition consisting essentially of a major portion of Portland cement, from 110 to 280 percent of the dry weight of said Portland cement of water, and from 20 to 40 percent of the dry weight of said Portland cement of diatomaceous earth ground coarsely enough to substantially preserve the major portion of the siliceous structure of the diatoms therein, said diatomaceous earth having the property of forming an essentially non-settling slurry having a bleeding value of not more than 3 when blended with said slurry.

28. In the method of cementing a casing in a well which comprises pumping a cement composition aqueous slurry comprising a hydraulic natural cement into the annular space between said casing and the borehole, the step of adding to the cement composition aqueous slurry weight percentages of the dry weight of said cement of from 0.1 to 10% of a cement thickening time extending and water loss reducing agent consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and from 15 to 70 percent of a diatomaceous earth ground coarsely enough to substantially preserve the major portion of the siliceous structure of the diatoms therein and having the property of forming an essentially non-settling slurry having a bleeding value of not more than 3 when blended with water and the other ingredients recited herein to produce said slurry.

29. A cement composition aqueous slurry consisting essentially of a major portion of Portland cement mixed with weight percentages of the weight of said dry Portland cement of 15 to 50% of diatomaceous earth, 0.1 to 10% of a cement thickening time extending and water loss reducing agent consisting of an alkali metal carboxymethyl hydroxyethyl cellulose mixed ether, in which the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, and 0.3 to 7% of a cement thickening time reducing agent having substantially no effect on said water loss consisting of sodium silicate having a silicon dioxide to sodium oxide weight ratio of from 1 to 2.5; and sufficient water to produce a pumpable slurry.

30. The cement composition of claim 1 wherein said light weight aggregate is a diatomaceous earth having the property of forming an essentially non-settling slurry having a bleeding value of not more than 3 when said composition is mixed with sufficient water to produce a pumpable slurry.

31. The cement composition of claim 2 wherein said light weight aggregate is a diatomaceous earth having the property of forming an essentially non-settling slurry having a bleeding value of not more than 3 when said composition is mixed with sufficient water to produce a pumpable slurry.

32. The cement composition aqueous slurry of claim 7 wherein said light weight aggregate is a diatomaceous earth having the property of forming an essentially non-settling slurry having a bleeding value of not more than 3 when said other ingredients and said diatomaceous earth are blended together to form said aqueous slurry.

33. The cement composition aqueous slurry of claim 8 wherein said light weight aggregate is a diatomaceous earth having the property of forming an essentially non-settling slurry having a bleeding value of not more than 3 when said other ingredients and said diatomaceous earth are blended together to form said aqueous slurry.

34. A well cementing composition consisting of a Portland cement aqueous pumpable slurry consisting essentially of Portland cement and from 15 to 50 percent of a dry weight of said Portland cement of diatomaceous earth ground coarsely enough to substantially preserve the major portion of the siliceous structure of the diatoms therein, said diatomaceous earth having the property of forming an essentially non-settling slurry having a bleeding value of not more than 3 when said cement and said diatomaceous earth are blended with sufficient water to produce said slurry.

35. A well cementing composition aqueous slurry consisting essentially of a major portion of a dry hydraulic natural cement mixed with weight percentages of the weight of said dry hydraulic natural cement of 15 to 70 percent of diatomaceous earth ground coarsely enough to substantially preserve the major portion of the siliceous structure of the diatoms therein and having the property of forming an essentially non-settling slurry having a bleeding value of not more than 3 when blended with water and the other ingredients recited herein to produce said slurry, 0.1 to 10 percent of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 and 1.75, the hydroxyethyl substitution is from 0.35 to 1.35, and the carboxyalkyl substitution is from 0.15 to 1.2 and salts of said mixed ethers, and sufficient water to produce a pumpable slurry.

References Cited in the file of this patent

UNITED STATES PATENTS

| | | |
|---|---|---|
| Re. 16,732 | Wig | Sept. 6, 1927 |
| 1,305,522 | Caven | June 3, 1919 |
| 1,547,189 | Wilson | July 28, 1925 |
| 2,285,302 | Patterson | June 2, 1942 |
| 2,313,107 | Wertz | Mar. 9, 1943 |
| 2,427,683 | Ludwig | Sept. 23, 1947 |
| 2,562,148 | Lea | July 24, 1951 |
| 2,580,565 | Ludwig | Jan. 1, 1952 |
| 2,582,459 | Ludwig | Jan. 15, 1952 |
| 2,618,595 | Gloor | Nov. 18, 1952 |
| 2,629,667 | Kaveler | Feb. 24, 1953 |
| 2,673,810 | Ludwig | Mar. 30, 1954 |

OTHER REFERENCES

Vail: Soluble Silicates in Industry, 1928. The Chemical Catalogue Co. Inc., New York, page 198.

Hercules CMHEC Prices. Hercules Powder Company, Wilmington 99, Delaware, November 1, 1954.

"Celite for Concrete," pamphlet BMM-350 of Johns Manville Co., published in August 1935; 2 pp.

UNITED STATES PATENT OFFICE
CERTIFICATE OF CORRECTION

Patent No. 2,985,239                                                May 23, 1961

Francis J. Shell

It is hereby certified that error appears in the above numbered patent requiring correction and that the said Letters Patent should read as corrected below.

Column 20, line 65, for "cem entof" read -- cement of --; column 22, line 2, for "hydroethyl" read -- hydroxyethyl --; column 24, line 22, for "5%" read -- 4% --.

Signed and sealed this 7th day of November 1961.

(SEAL)
Attest:

ERNEST W. SWIDER                                         DAVID L. LADD
Attesting Officer                                           Commissioner of Patents

USCOMM-DC